(12) United States Patent
Lescoche

(10) Patent No.: US 9,669,362 B2
(45) Date of Patent: Jun. 6, 2017

(54) FILTRATION MEMBRANE HAVING IMPROVED RESISTANCE TO ABRASIONS

(75) Inventor: Philippe Lescoche, Piegon (FR)

(73) Assignee: TECHNOLOGIES AVANCEES ET MEMBRANES INDUSTRIELLES, Nyons (FR)

( * ) Notice: Subject to any disclaimer, the term of this patent is extended or adjusted under 35 U.S.C. 154(b) by 723 days.

(21) Appl. No.: 13/127,491

(22) PCT Filed: Nov. 3, 2009

(86) PCT No.: PCT/FR2009/052125
§ 371 (c)(1),
(2), (4) Date: Oct. 20, 2011

(87) PCT Pub. No.: WO2010/052424
PCT Pub. Date: May 14, 2010

(65) Prior Publication Data
US 2012/0118813 A1    May 17, 2012

(30) Foreign Application Priority Data
Nov. 7, 2008 (FR) ..................................... 08 57584

(51) Int. Cl.
*B01D 67/00* (2006.01)
*B01D 69/02* (2006.01)
*B01D 71/02* (2006.01)
*B01D 71/54* (2006.01)

(52) U.S. Cl.
CPC ......... *B01D 69/02* (2013.01); *B01D 67/0004* (2013.01); *B01D 67/0041* (2013.01); *B01D 71/024* (2013.01); *B01D 71/025* (2013.01); *B01D 71/027* (2013.01); *B01D 71/54* (2013.01); *B01D 2325/24* (2013.01)

(58) Field of Classification Search
CPC   B01D 67/0004; B01D 67/0041; B01D 69/02; B01D 71/027; B01D 71/024; B01D 71/025; B01D 71/54; B01D 2325/24
USPC ............... 210/488, 490, 500.21, 501, 502.1, 210/503–509, 510.1; 427/202, 256
See application file for complete search history.

(56) References Cited

U.S. PATENT DOCUMENTS

| | | | |
|---|---|---|---|
| 4,810,273 A | 3/1989 | Komoda | |
| 5,030,350 A | 7/1991 | Muller | |
| 5,858,523 A | 1/1999 | Kawai et al. | |
| 2003/0132174 A1 | 7/2003 | Isomura et al. | |
| 2006/0049094 A1* | 3/2006 | Lescoche | 210/321.87 |
| 2008/0190841 A1 | 8/2008 | Pascaly et al. | |

(Continued)

FOREIGN PATENT DOCUMENTS

| | | |
|---|---|---|
| EP | 1 652 678 | 8/2007 |
| GB | 2201355 A * | 9/1988 |
| JP | 2005-270707 | 10/2005 |

(Continued)

*Primary Examiner* — Madeline Gonzalez
(74) *Attorney, Agent, or Firm* — Clark & Brody

(57) ABSTRACT

The subject of the invention is a membrane for the crossflow filtration of a fluid to be treated that contains abrasive particles, comprising a porous support covered over part of its surface with a separation layer having a pore diameter smaller than that of the support, over which the fluid to be treated flows, characterized in that the separation layer includes an agent for protection from the abrasive particles.

15 Claims, 2 Drawing Sheets

(56) References Cited

U.S. PATENT DOCUMENTS

2008/0237126 A1* 10/2008 Hoek et al. .................. 210/637

FOREIGN PATENT DOCUMENTS

| JP | 2006-150349 | 6/2006 |
| WO | 03/010421 | 2/2003 |
| WO | 2008/114046 | 9/2008 |

* cited by examiner

FILTRATION MEMBRANE HAVING IMPROVED RESISTANCE TO ABRASIONS

The present invention relates to the technical field of cross-flow filtration (also called tangential filtration). In particular, the subject of the invention is novel filtration membranes having improved abrasion resistance, and the process for manufacturing them.

Membrane separation processes are used in many sectors, especially in the environment for the production of potable water and the treatment of industrial effluents, in the chemical, petrochemical, pharmaceutical and food processing industries and in the biotechnology field.

A membrane constitutes a thin selective barrier which, under the action of a transfer force, enables certain components of the medium being treated to pass through it or to be stopped thereby. Whether the components are let through or stopped may depend on their size in relation to the pore size of the membrane that then behaves as a filter. These techniques are called microfiltration, ultrafiltration or nanofiltration depending on the pore size.

Membranes having different textures and structures exist. Some of these are composed of organic materials, of the synthetic polymer type, and are called organic membranes, while others are composed of inorganic materials and are called inorganic membranes.

Inorganic membranes generally consist of a macroporous support from 0.5 to 3 mm in thickness, which provides the membrane with mechanical strength and also its shape, and therefore determines the filtering area of the membrane. This support is generally made of carbon, a metal oxide, especially of the alumina, titanium dioxide or zirconium dioxide type, whether pure or as a mixture, an aluminosilicate or silicon carbide. One or more layers of a few microns in thickness ensuring the separation and said separating layers, or separation layers, are deposited on this support. The thicknesses of these layers typically vary between 1 and 100 µm. During separation, the fluid is transferred through the separating layer, and then the fluid spreads throughout the porosity of the support to be directed toward the external surface of the porous support. That portion of the fluid to be treated that has passed through the separation layer and the porous support is called the "permeate" and is recovered by a collection chamber surrounding the membrane. The other portion is called the "retentate" and is usually reinjected upstream of the membrane, via a circulation loop, into the fluid to be treated.

The pore diameter is chosen according to the size of the species to be separated. These layers of inorganic nature consist in general of metal oxides, glass or carbon and are bonded together and to the support by sintering. The support and the separating layers differ, in particular, by different mean diameters of the pores or porosity or by different masses per unit area. The notions of microfiltration, ultrafiltration and nanofiltration separating layers are well known to those skilled in the art. It is generally accepted that:
 the supports have a mean pore diameter of between 2 and 12 µm;
 the microfiltration separating layers have a mean pore diameter of between 0.1 and 2 µm and a mass per unit area of between 30 and 100 $g/m^2$;
 the ultrafiltration separating layers have a mean pore diameter of between 0.01 and 0.1 µm and a mass per unit area of between 5 and 15 $g/m^2$;
 the nanofiltration separating layers have a mean pore diameter of between 0.5 and 2 nm and a mass per unit area of between 1 and 5 $g/m^2$.

According to the principle of cross-flow filtration, the fluid to be treated flows at high velocity over the surface of the separation layer or layers, so as to generate a shear stress that redisperses the matter deposited on this surface. Thus there is friction of the fluid on the surface of the filtration layer.

In many applications of membrane cross-flow filtration, in microfiltration (MF) and in ultrafiltration (UF), the retentate may contain abrasive particles. These particles, under the effect of the circulation of fluid in the retentate loop, abrade the separation layers, thus prematurely damaging the membrane.

Specifically, the abrasion sensitivity of the separation layers is due to the fact that these layers are in direct contact with the abrasive particles contained in the retentate. During circulation of the retentate in the channels of the tubular membrane, at flow rates varying from 1 to a few m/s, the particles strike the surface of the layer with high energy. In addition, since these particles are significantly larger than the pore diameters of the layer, these particles remain indefinitely in the retentate loop, or even become concentrated therein.

The relatively low abrasion resistance of ceramic separation layers is due to their high porosity. Now, the ceramics used in the manufacture of separation layers are very resistant to abrasion when they are dense, as is the case of high-performance ceramics used in mechanical applications. When the ceramic firing temperature increases, the pore volume decreases until a fully dense material is obtained. At the same time, the number of chemical bonds between ceramic grains increases and the force of these bonds increases, resulting in an increasingly solid material.

However, in the case of filtration membranes, it is obvious that these layers must remain highly porous so as to increase the permeation flux. To obtain a high permeation flux, the separation layers are sintered at temperatures well below their densification temperature, thus preventing them from reaching their maximum level of abrasion resistance.

Furthermore, the ceramic grains constituting the separating layers are of small diameter, since the pore diameters required in microfiltration and ultrafiltration are very small. The grain size of the ceramic particles constituting these layers ranges in particular between about 20 nm and 1 µm. An abrasive particle of a few tens of microns or a few hundred microns size that strikes such a layer therefore has a very strong mechanical impact.

To alleviate these drawbacks, two solutions have hitherto been proposed:
 to increase the firing temperature of the layers as much as possible;
 to increase the thickness of the layers.

However, these two solutions remain very limited since, on the one hand, to maintain a sufficient porosity and obtain the correct pore diameter, the possible range of firing temperatures remains limited and, on the other hand, increasing the thickness does retard the total degradation of the layers, without really significant gain being achieved.

There is therefore a real need for other solutions.
The abrasion is all the more aggressive when:
 the concentration of particles is high;
 the flow rate is high;
 the particles are hard and very abrasive.

The size of these solid abrasive particles may range from a few microns to a few mm. In the context of the present patent application, the term "abrasive particles" is used to denote abrasive elements that do not necessarily have a spherical shape but may often have any shape, especially in the form of chips or aggregates.

Without being exhaustive, mention may be made of a few examples of abrasive particles and examples of membrane applications in which they are encountered:

metal particles or chips of any type of metal, for example stainless steel, various other steels or iron, encountered in particular in the recycling of degreasing baths, the recycling of machining baths, the treatment of cutting fluids and the recovery of micron-size particles;

mineral particles or aggregates of any type of inorganic material, for example oxides, active carbon, silica or sand, encountered in particular in membrane bioreactors, especially those used in the treatment of water, the treatment of leachates, the treatment of nuclear effluents, the clarification of tartar-containing drinks, the recycling of catalysts, treatments with filtration additives (for example active carbon), the treatment of effluents in the ceramic industry, the molecular separation of fermentation musts, etc.;

particles of organic origin such as, for example, fruit shell or husk residues, sugar, etc. encountered, for example, in the clarification of sweetened juice.

For these applications, and others (not mentioned), the membranes wear out very rapidly, making their use very expensive or even have no technical solution. This is why it is very important to be able to satisfy this requirement.

In this context, the aim of the present invention is to provide novel membranes that have, in the case of applications in abrasive media, a longer lifetime while still being able to be produced at lost cost and by an industrial process.

The subject of the invention relates to a novel inorganic membrane that has a much better abrasion resistance than the current membranes and a process for manufacturing such a membrane.

One subject of the invention is therefore a membrane for the cross-flow filtration of a fluid to be treated that contains abrasive particles, comprising a porous support covered over part of its surface with a separation layer having a mean pore diameter smaller than that of the support, over which the fluid to be treated flows, characterized in that the separation layer includes an agent for protection from the abrasive particles, intended to protect the separation layer from abrasive attack.

Another subject of the invention is a process for manufacturing such a membrane, which comprises one of the following steps:

either the deposition of the protection agent on the surface of the separation layer of the membrane;

or the incorporation of the protection agent in the form of individualized protection elements during deposition of the separation layer. According to one embodiment, the size of the protection elements is greater than or equal to the thickness of the separation layer. According to another embodiment, the separation layer is a multilayer and the size of the protection elements is greater than or equal to the thickness of the active layer of the separation layer.

Various other features will emerge from the description given below with reference to the appended drawings which show, by way of nonlimiting examples, embodiments of the invention.

Figure 4:
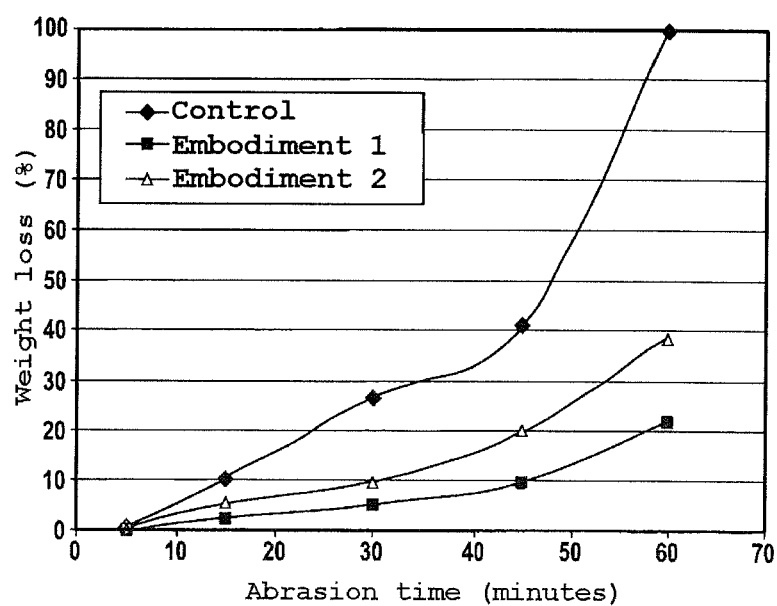

FIG. 4 compares the variation in weight loss of the separation layer during abrasion, obtained with filtration elements according to the invention and with membranes according to the prior art.

Figure 1:
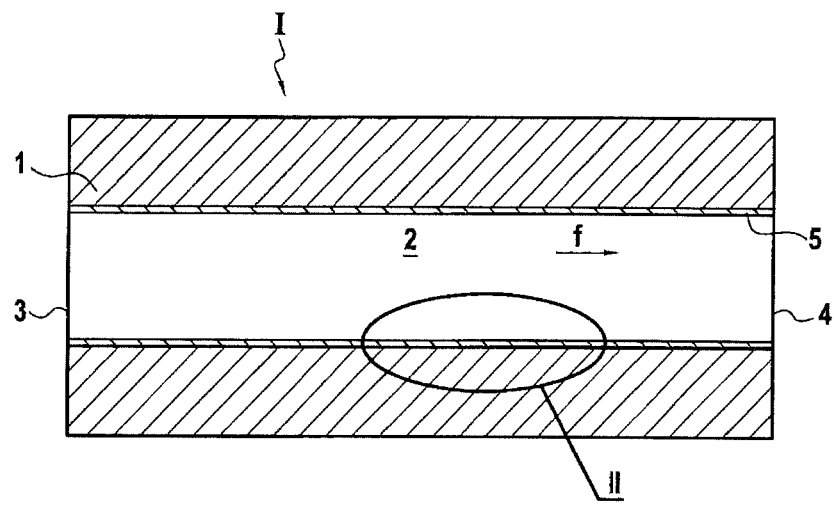
FIG. 1 is a cross-sectional view of one embodiment of a membrane according to the invention.

The membranes according to the invention may have a tubular or flat support. In the field of tubular membranes, the rigid porous support is of elongate shape, having a polygonal or circular cross section. The porous support is designed to have at least one channel, and preferably a series of channels that are parallel to one another and on the longitudinal axis of the porous support, each having a cylindrical shape. FIG. 1 shows an embodiment of a filtration element I of tubular shape and circular cross section, comprising a support 1 in which a single channel 2 is provided. The channels communicate, on one side, with an inlet chamber for the fluid medium to be treated and, on the other side, with an outlet chamber. The fluid to be filtered flows through the channel 2, in the direction f, from the inlet 3 to the outlet 4. The surface of the channels is covered with at least one separating layer, for separating the molecules or particles contained in the fluid medium flowing inside the channels, in a given direction, from one end of the channels to the other. This separation layer is shown as the reference 5 in FIG. 1. Such a membrane acting as a sieve, separates the molecular or particulate species of the product to be treated, insofar as all the particles or molecules larger than the pore diameter of the membrane are stopped. During separation, the fluid is transferred through the separating layer, and then the fluid spreads through the porosity of the support to be directed toward the external surface of the porous support. That portion of the fluid to be treated that has passed through the separation layer and the porous support is called the permeate and is recovered by a collection chamber surrounding the membrane.

In the context of the invention, the membrane may be of flat character. In this case, the separation layer may be deposited directly on one of the faces of the support. The porous support may also be in the form of a block in which at least one channel, and in general a series of superposed channels is provided, each having a polygonal, generally rectangular, cross section. The surface of the channels is covered with at least one separating layer.

The support may, for example, be made of carbon, of aluminosilicate or silicon carbide, or preferably of metal oxide, especially of the alumina, titanium dioxide or zirconium dioxide type, whether pure or as a mixture.

The separation layer may be a monolayer or a multilayer. In the rest of the description, the term "separation layer" refers either to a single filtration layer (in the case of a monolayer) or the combination of successive filtration layers (in the case of a multilayer comprising one or more intermediate layers). In particular, the separation layer may be made up of a single microfiltration layer having a mean pore diameter of 0.1 to 2 μm, or else an ultrafiltration layer having a mean pore diameter of 0.01 to 0.1 μm. The mean pore diameter may especially be determined by mercury intrusion porosimetry in the case of microfiltration layers, or by retention measurements using dextran standards, as described in the NF X 45-103 standard, in the case of ultrafiltration layers. It is possible for this microfiltration or ultrafiltration layer to be deposited directly on the porous support (in the case of a monolayer separation layer) or else on an intermediate layer of smaller mean pore diameter, which is itself deposited directly on the porous support (in the case of a monolayer separation layer). The separation layer may, for example, be based on or exclusively consist of a metal oxide, in particular chosen from $TiO_2$, $Al_2O_3$ and $ZrO_2$, by itself or as a mixture. In the case of a multilayer separation layer, the last filtration layer deposited is that over which the fluid to be treated flows and determines the cutoff threshold of the membrane: this layer is called the active layer of the separation layer.

According to their main feature, the membranes according to the invention include a protection agent for protecting from the abrasive particles, capable of protecting their separation layer from abrasive attack. The protection agent is therefore separate from the separation layer, even though it may be incorporated within the latter. It may be positioned so as to guarantee protection of the separation layer and will therefore be located directly in contact with or in very close proximity to the surface over which the fluid to be treated flows. The expression "protection agent for protecting from the abrasive particles" is understood to mean an agent made of a very resistant material that makes it possible to limit the wear of the separation layer with respect to attack by abrasive particles during the use of the membrane. This protection agent may be in the form of individualized protection elements or else in the form of a porous film. The role of the protecting agent is to absorb a significant fraction of the energy of the abrasive particles contained in the medium to be filtered and/or to reflect these particles, so as to lessen, or even prevent, their contact with the separation layer.

Advantageously, the protection agent is in the form of protection elements, such as particles, rods or chips distributed within or on the surface of the separation layer. In all cases, the protection elements must be in the very close vicinity of the surface over which the fluid to be treated flows so as to be able to fully fulfill their role as abrasive particle reflectors. These protection elements have a size in the range from 1 µm to 1 mm, preferably in the range from 10 to 100 µm. This size, which corresponds to the largest dimension of the protection element, may especially be determined by scanning electron microscopy. It should be noted that in the case in which the protection elements are spherical particles, the largest dimension corresponds to the particle diameter. To manufacture the membranes according to the invention, protection elements are used that are either incorporated directly into the separation layer during its construction, or deposited on the latter after it has already been formed. Thus, the protection elements, used upstream of their incorporation into the membrane, will preferably have a size chosen in the range from 1 µm to 1 mm, preferably in the range from 10 to 100 µm. The size of the protection elements that corresponds to their largest mean dimension may be measured by laser particle size analysis by placing the protection elements in suspension in water. The largest mean dimension corresponds, in the context of the invention, to the volumic $d_{50}$ (50% by volume of the protection elements consists of elements having their largest dimension smaller that $d_{50}$ and 50% consists of elements having their largest dimension larger than $d_{50}$). Laser particle size analysis is particularly suitable for measuring sizes up to 100 µm, while beyond this (100 µm to 1 mm) other techniques, such as screening or optical microscopy, will advantageously be used.

This size must be sufficient to withstand the impact of the abrasive particles. For example, it will be of the order of magnitude or larger than the size of the abrasive particles, without however disturbing the flow of the fluid through the channels. In addition, if the protecting elements are of mineral origin, too large a size would impair their attachment to the surface of the membrane owing to the excessively low reactivity thereof during sintering. Moreover, if the protecting elements are incorporated into the separation layer, it will be preferable to use elements having a mean size of the order of magnitude of the thickness of the separation layer. The size of the elements as defined above corresponds, for example, to the thickness of the separation layer ±20%. In the case of a multilayer separation layer, the size of the protection elements may also be of the order of magnitude of the thickness of the active layer and may, for example, be equal to its thickness ±20%.

The protection agent may be of mineral or organic nature. To give an example, the protection agent may include or consist exclusively of a polymer such as, for example, polyurethane which, although organic, is very hard and known for its abrasion resistance, or of a mineral material such as the metal oxides and metal carbides conventionally used as the constituent materials of membranes. To give an example, the protection agent may be based on or consist exclusively of $TiO_2$, $Al_2O_3$, $ZrO_2$, carbon, SiC or an aluminosilicate. According to one advantageous embodiment, the protection agent is in the form of protection elements made of the same material as that of the separation layer to be protected. It is the size of the protection elements, much larger, for example 10 to 100 times larger, than the size of the grains serving to constitute the separation layer by sintering, which enables them to fulfill their role as abrasion protectors. From a practical standpoint, by using the same material for the separation layer and the protection elements, the processing is facilitated: specifically, during sintering, the protection elements easily associate with the separation layer. However, although of the same chemical nature as the grains serving to constitute the separation layer, the protection elements, by dint of their size, retain their integrity during the step of sintering the separation layer. In addition, in the case of a material of the same nature, the protection elements comply with the same constraints (except, of course, those associated with the abrasion resistance for which their performance is superior), in particular in terms of chemical resistance, as the separation layer.

If the protection agent is of the organic type, for example made of polyurethane, the latter may advantageously be on the surface of the separating layer, in the form of a protective coating, which may be in the form of particles disseminated over the surface of the membrane, or in the form of a continuous film, but one which is porous so as not to disturb the filtration properties of the membrane.

According to one embodiment, the mass of the protection agent represents from 10 to 70% of the mass of the separation layer; the expression "mass of the separation layer" is understood, of course, to mean excluding the protection agent even if the latter is inserted into the separation layer. When the protection agent is of inorganic nature, in general it is in the form of individualized protection elements. Preferably, the mass of the protection elements then represents from 40 to 60% of the mass of the separation layer. When the protection agent is of organic nature, it may be in the form of individualized protection elements or in the form of a porous layer or film. Advantageously, the organic protection agent is on the surface of the separation layer and preferably covers from 10 to 70% of the surface of the separation layer. Independently, the shape (and especially the size in the case of individualized protection elements) and the density of the protection elements serve to optimize their efficiency.

Figure 2:
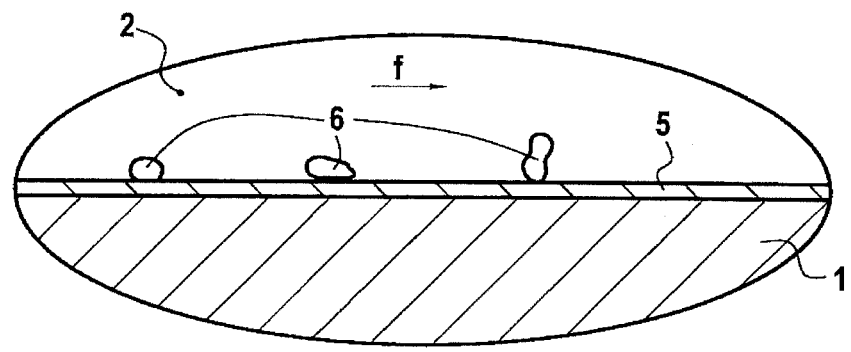
FIG. 2 is an intentionally enlarged sectional view of the part II of a support covered with a separation layer, comprising protection elements on the surface.

The protection agent may be deposited on the surface of the separation layer or else completely or partially incorporated into the latter. Advantageously, in order for its role as protection agent to be fully fulfilled, the latter will be located flush with or extending beyond the surface of the separation layer over which the fluid to be treated flows, being partially incorporated into the separation layer in order to facilitate its attachment. FIG. 2 illustrates an embodiment in which the protection agent consists of individualized protection elements 6 that are deposited on the surface of the separation layer. Depositing them on the surface of the separation layer has the advantage of ensuring that the separation performance is not impaired by any interaction between the protecting elements and the elements constituting the separation layer, during their manufacture. In addition, the protecting agents of organic nature will be unable to be incorporated into the layer without suffering degradation during sintering. They may be added only after complete manufacture of the separation layer, and therefore on the surface thereof.

Figure 3:
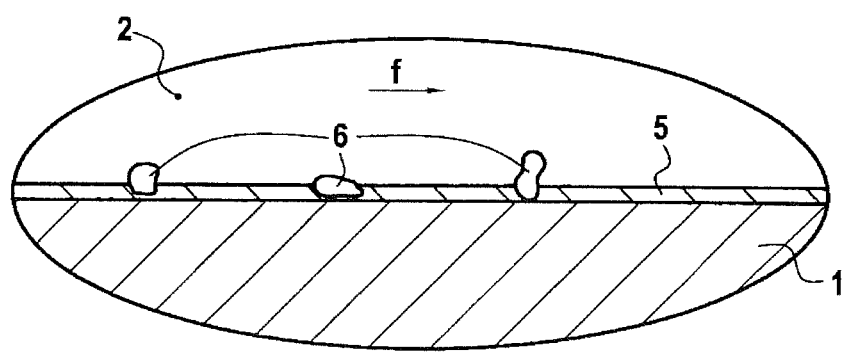
FIG. 3 is an intentionally enlarged sectional view of the part II of a support covered with a separation layer, into which protection elements are partially incorporated.

FIG. 3 illustrates an embodiment in which the protection agent consists of individualized protection elements 6 that are only partly incorporated into the separation layer. The incorporation of the protection elements into the separation layer has the advantage of ensuring that these elements are perfectly attached to the membrane.

The process for producing an inorganic membrane conventionally consists in preparing a suspension containing a solvent, such as water or an alcohol, the ceramic powder to be deposited, additives, such as dispersants and antifoams, and one or more organic binders, the role of which is to adjust the viscosity and the rheological characteristics. The pH may optionally be adjusted by addition of acid or base. Next, deposition on the substrate (the support or the support already covered with one or more layers) is carried out by filling the channels in the case of tubular membranes, or by spraying in the case of flat membranes. The parts are then dried and sintered.

According to the invention, when the protective elements are incorporated into the separation layer, the protection elements, for example in the form of an inorganic powder of large particle size, especially as defined above, are added to the suspension. The amount and the nature of the additives, and also those of the binders, are optionally modified so as to optimize the incorporation of the protection elements into the suspension. A homogeneous mixture is obtained by using an impellor or any other equipment conventionally used for making mixtures. Next, deposition is carried out by filling the channels in the case of tubular membranes or by spraying in the case of flat membranes. The parts are then dried and sintered.

According to one embodiment of the invention, several successive deposits may be formed so as to increase the thickness of the separation layer. These successive deposits may or may not be intercalated at firing. According to one embodiment, the protective elements are incorporated into the last deposit constituting the surface layer of the multilayer separation layer over which the fluid to be filtered will flow, during the filtration step thereof.

According to another embodiment of the invention, after the deposit or deposits containing the protection elements have been deposited, one or more deposits may be added on top using a conventional method. This has the benefit of perfectly encapsulating and therefore attaching the protection elements.

The protection elements may also be deposited on top of the separation layer. To do this, a suspension is prepared that comprises:
- the protective elements, especially in the form of a powder, granules, chips, etc.;
- a solvent, for example such as water or an alcohol;
- an organic binder, for example such as a cellulose-based binder or one based on polyvinyl alcohol or polyethylene glycol;
- additives for optimizing the dispersion and the stability of the suspension;
- optionally, an acid or a base in order to adjust the pH of the suspension.

Next, the protection elements are deposited by impregnating the membrane with this suspension. In the case of a tubular membrane, the channels, evacuated after a hold, are filled with the suspension and then dried and sintered at high temperature, typically at a temperature in the 400-1200° C. range.

If the protection agent is of organic nature, for example made of polyurethane, the manufacturing process may include the deposition, on the separation layer to be protected, of a polyurethane suspension followed by drying in an oven intended to cure the polyurethane and to make it adhere. The protective deposit obtained may be in the form of particles disseminated over the surface of the membrane or in the form of a continuous, porous film, depending in particular on the heating temperature during the oven treatment.

The following embodiments serve to illustrate the invention but have no limiting character. The sizes of the $TiO_2$ grains were determined, by laser particle size analysis, using a Malvern laser particle analyzer. The measurement was carried out in deionized water after the powder had been dispersed ultrasonically for 30 seconds. The size obtained is the mean size A of the grains that corresponds to the volumic $d_{50}$ (50% of the volume of powder consists of particles smaller than A and 50% of particles larger than A).

EMBODIMENT 1

On a porous support of $TiO_2$ composition, with a pore volume equal to 30%, a mean pore diameter of 4.5 μm, and comprising a $TiO_2$ first filtration layer with a mean pore diameter of 0.45 μm and a mean thickness of 25 μm, a second filtration layer, incorporating protection elements according to the invention, was produced by impregnation of a suspension. This suspension was prepared by grinding $TiO_2$ powder, with an initial mean grain size of 0.3 μm, in water to which a dispersant of the Coatex family was added. Next, powder of $TiO_2$ composition with a mean grain size of 20 μm was added. The suspension was mixed using an impellor. A cellulose binder was then added.

After drying and firing at 900° C. in air, a membrane with a cutoff threshold of 0.14 μm was obtained.

The suspension was prepared in the following proportions:
- 0.3 μm $TiO_2$ powder in water with a concentration of 50 g/l of water;
- 50% by weight of 20 μm $TiO_2$ protecting element;
- 22% by weight of cellulose binder;
- 0.5% by weight of dispersant.

The proportions of the last three elements are expressed as a % by weight of the amount of $TiO_2$ of 0.3 μm grain size.

EMBODIMENT 2

Protection elements were deposited on a membrane, consisting of a $TiO_2$ macroporous support, a $TiO_2$ sublayer with a mean pore diameter of 0.45 µm and a thickness of 25 µm, and a $TiO_2/ZrO_2$ (30 wt % $TiO_2$/70 wt % $ZrO_2$) second separation layer with a mean pore diameter of 0.14 µm and a thickness of 10 µm, by coating with an aqueous suspension comprising:

water;

a $TiO_2$ powder of 20 µm mean grain size with a concentration of 20 g/l of water;

a dispersant of the Coatex family (0.5 wt % of the amount of $TiO_2$);

a cellulosic binder (12 wt % of the amount of $TiO_2$).

After drying and firing at 1000° C., a 0.14 µm thick membrane partially covered with $TiO_2$ protective elements was obtained.

The abrasion resistance was characterized by blowing highly abrasive SiC particles, with a mean grain diameter of 100 µm, into the channels of the membrane. The weight of the filtration layer was weighed at regular intervals so as to determine its rate of wear. This method is particularly severe, but it enables the abrasion resistance of the membranes to be compared with one another. FIG. 4 illustrates the variation of the weight loss of the separation layer as a function of the abrasion time. Although a conventional membrane ($TiO_2$ support; $TiO_2$ separation layer; tubular membrane of 25 mm diameter with 8 channels and a cutoff threshold of 0.14 µm) irremediably becomes degraded right from the first moment, to be completely abraded after 60 minutes, the membrane produced according to Example 1 lost only 20% of the weight of its separation layer and the membrane produced according to Example 2 lost about 40% of its weight. The two membranes produced according to the invention therefore continue to function, whereas the conventional membrane is destroyed. The lifetime of the membranes according to the invention may be estimated to be twice that of the conventional membranes, which is very significant.

The invention is not limited to the examples described and represented, as various modifications may be applied to the invention without departing from the scope thereof.

The invention claimed is:

1. A membrane for the cross-flow filtration of a fluid to be treated that contains abrasive particles, comprising a porous support covered over part of its surface with a separation layer having a pore diameter smaller than that of the support, over which the fluid to be treated flows, characterized in that the separation layer is based on or consists exclusively of $TiO_2$, $Al_2O_3$, or $ZrO_2$, either by itself or as a mixture, and in that the separation layer includes an agent for protection from the abrasive particles, intended to protect the separation layer from abrasive attack, the protection agent:

being deposited on the surface of the separation layer or completely or partially incorporated into the latter, so as to be located flush with or extending beyond the surface of the separation layer over which the fluid to be treated flows, being of inorganic nature, and being in a form of individualized protection elements having a size from 1 µm to 1 mm.

2. The membrane as claimed in claim 1, characterized in that the protection agent represents from 10 to 70% of the mass of the separation layer.

3. The membrane as claimed in claim 1, characterized in that the protection agent is based on or consists exclusively of $TiO_2$, $Al_2O_3$, $ZrO_2$, carbon, SIC or silicon aluminate.

4. The membrane as claimed in claim 1, characterized in that the protection elements are deposited on the surface of the separation layer.

5. The membrane as claimed in claim 1, characterized in that the protection elements are incorporated, at least partly, into the separation layer.

6. The membrane as claimed in claim 1, characterized in that the protection elements are in the form of particles, rods or chips.

7. The membrane as claimed in claim 1, characterized in that the mass of the protection elements represents from 40 to 60% of the mass of the separation layer.

8. The membrane as claimed in claim 1, characterized in that the separation layer is a microfiltration layer having a mean pore diameter of 0.1 to 2 µm.

9. The membrane as claimed in claim 1, characterized in that the separation layer is an ultrafiltration layer having a mean pore diameter of 0.02 to 0.1 µm.

10. The membrane as claimed in claim 1, characterized in that the separation layer is composed of a single layer.

11. The membrane as claimed in claim characterized in that the separation layer is composed of several layers.

12. A process for manufacturing a membrane as claimed in claim 1, which comprises one of the following steps:

either the deposition of the protection agent on the surface of the separation layer of the membrane;

or the incorporation of the protection agent during deposition of the separation layer.

13. The process as claimed in claim 12, characterized in that it includes the incorporation, during deposition of the separation layer, of the protection agent in the form of individualized protection elements, the size of the protection elements being greater than or equal to the thickness of the separation layer.

14. The process as claimed in claim 12, characterized in that the separation layer is a multilayer and in that it includes the incorporation, during deposition of the separation layer, of the protection agent in the form of individualized protection elements, the size of the protection elements being greater than or equal to the thickness of an active layer of the separation layer.

15. The membrane as claimed in claim 1, characterized in that the size of the protection elements is greater than or equal to the thickness of the separation layer.

* * * * *